May 29, 1945.  F. A. NICHOLS  2,377,096
BALANCING DEVICE
Filed Oct. 22, 1943  2 Sheets-Sheet 1
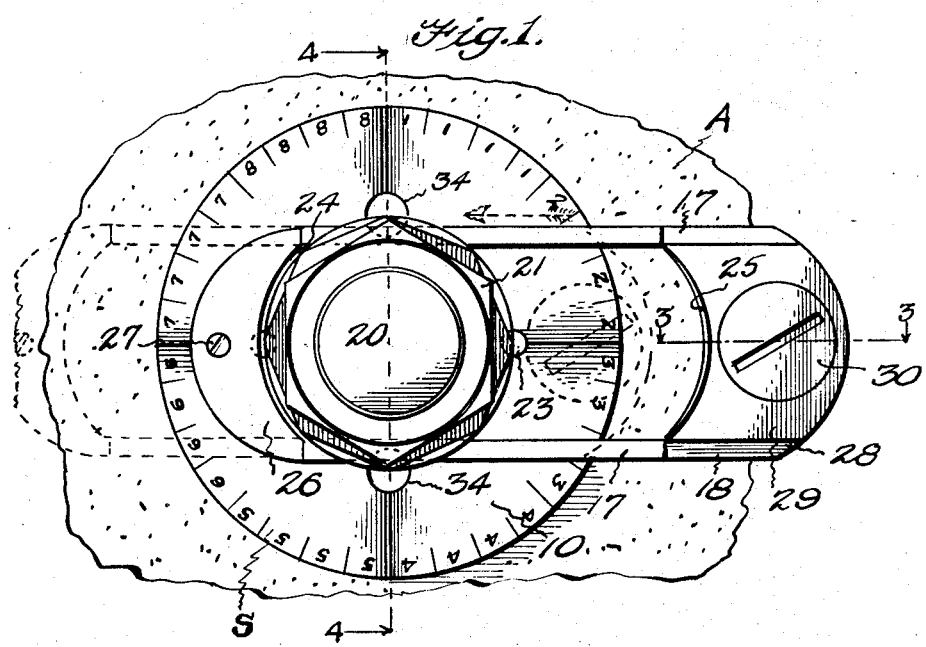
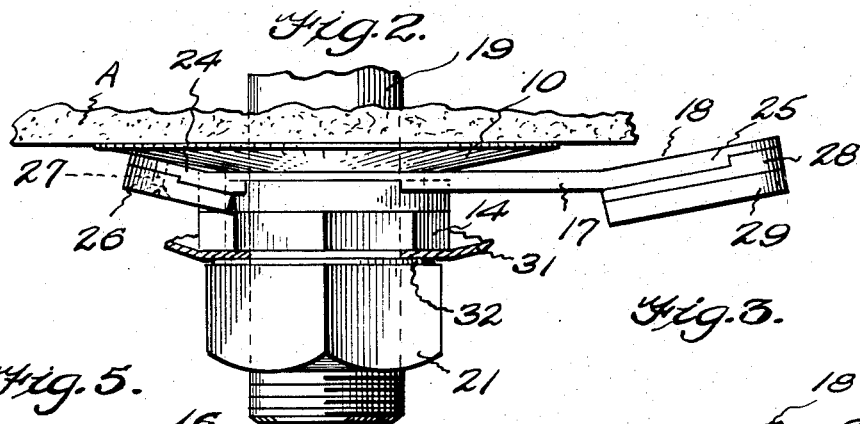
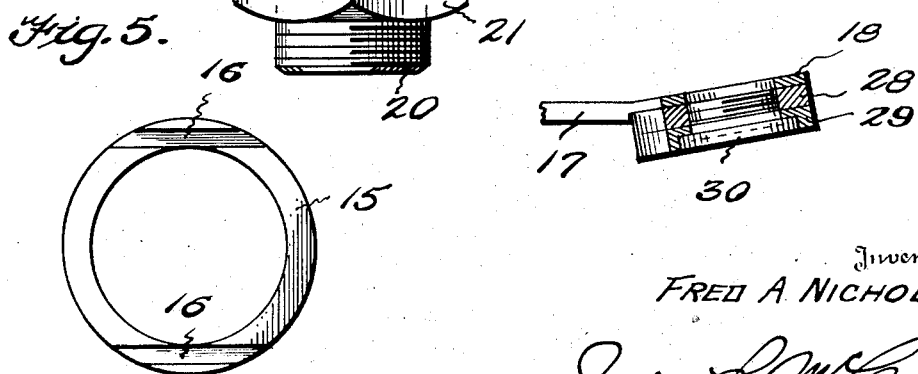
Inventor
FRED A. NICHOLS
By
Attorney

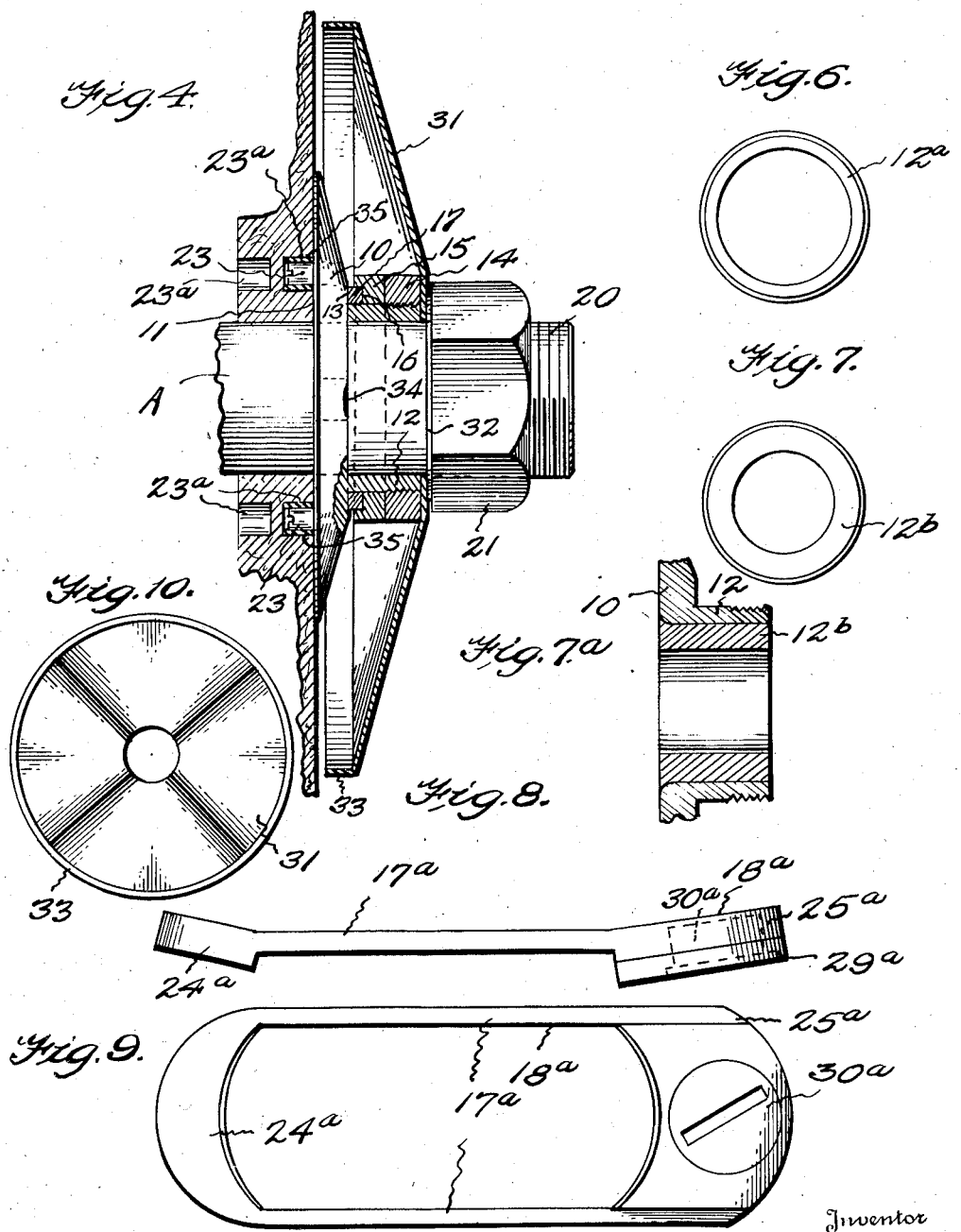

Patented May 29, 1945

2,377,096

UNITED STATES PATENT OFFICE 2,377,096

BALANCING DEVICE

Fred A. Nichols, Detroit, Mich.

Application October 22, 1943, Serial No. 507,335

3 Claims. (Cl. 51—169)

This invention relates to balancing devices and has for one of its objects the production of a simple and efficient means for balancing a rotatable member, such as a polishing or grinding wheel and the like.

A further object of this invention is the production of a balancing device which is simply constructed, inexpensive to manufacture, and which may be accurately adjusted in a highly convenient manner.

Another object of this invention is to provide a balancing device which is detachably secured to the rotatable member, and which may be conveniently attached thereto and removed therefrom.

Other objects and advantages will appear throughout the following specification and claims.

In the drawings—

Figure 1 is a side elevational view of the balancing device;

Figure 2 is a top plan view of the balancing device, a portion of the rotatable member being shown.

Figure 3 is a horizontal sectional view taken on line 3—3 of Figure 1;

Figure 4 is a vertical sectional view taken on line 4—4 of Figure 1;

Figure 5 is a side elevational view or the clamping ring removed from the assembly and illustrating the slots formed therein for receiving the balancing arm;

Figure 6 is a side elevational view of one size of detachable center bushing;

Figure 7 is a side elevational view of another size of detachable center bushing which may be used upon a smaller center arbor than that illustrated in Figure 6;

Figure 7a is a sectional view illustrating the bushing shown in Figure 7 applied to the body portion of the balancing device;

Figure 8 is a top plan view of a modified form of the balance arm;

Figure 9 is a side elevational view of the form of balancing arm shown in Figure 8;

Figure 10 is a plan view of the inclosing disc, on a reduced scale and looking at the inner face thereof.

By referring to the drawings, it will be seen that 10 designates the body portion of the device, in the nature of a disc having a flat face 11, which is adapted to fit against a rotatable member such as a polishing or grinding wheel or similar element A. The body portion 10 is provided upon its opposite face with beveled sides terminating in an outwardly projecting center bushing 12. The bushing 12 is surrounded by a flat abutment wall 13. The bushing 12 is threaded at its outer end to receive a threaded clamping nut or collar 14. A clamping ring 15 is held upon the bushing 12 by means of this clamping nut or collar 14. The clamping ring 15 is provided upon one face with a pair of parallel transverse slots 16 for receiving the parallel side strips 17 of the balancing arm 18 hereinafter described. The supporting spindle 19 carries the rotatable member A and the balancing device. The spindle 19 is provided with a projecting threaded end 20 which projects through the center and outwardly beyond the clamping nut or collar 14. A retaining nut 21 is threaded upon the extension 20 and engages the clamping nut 14, which in turn engages bushing 12 for holding the entire device firmly against the side of the wheel or rotatable member A.

The body portion 10 of the device is provided with two pins 23 which extend into suitable sockets which are formed on both sides of the polishing wheel or rotatable member A, to removably attach the body portion 10 to the member A and to prevent the body portion 10 from rotating relative to the member A while balancing the device. It should be understood that the body portion 10 will in this manner be rigidly secured to the polishing wheel or member A, and that the balancing device may be readily detached therefrom when desired, in a highly efficient manner. It should be further understood that the balancing arm 18 may be firmly clamped to the body portion 10 and securely held in an adjusted position by means of tightening the clamping nut or collar 14, which will bind the parallel side strips 17 of the balancing arm 18 against the flat wall 13 of the body portion 10.

It should be understood that the forms of my invention herewith shown and described are to be taken as preferred examples of the same, and that various changes in shape, size and arrangement of parts may be employed without departing from the spirit of the invention as defined in the following claims.

The balancing arm 18 may be constructed of "Bakelite" material, or other suitable non-metal material, to decrease cost of construction. One form of such an arrangement is shown in Figures 1 and 2, wherein the side strips or rails 17 support integral semi-circular end pieces 24 and 25. The end-piece 24 carries a segmental weight 26 preferably of metal, and this weight 26 is secured to the end-piece 24 by means of a countersunk screw 27. The end-piece 25 carries a weight 28 which may be secured in any suitable manner to the end-piece 25 and a detachable segmental weight 29 is attached to the weight 28 by means of a counter-sunk threaded plug 30. The end pieces 24 and 25 are preferably inclined or bent inwardly toward the wheel A to bring the weight of the balancing device as close as possible to the polishing wheel A as shown in Figure 2.

As shown in Figures 8 and 9, the balancing arm 18ª may be made of a single piece of material such as steel or other metal, and is provided with parallel side strips or rails 17ª which are connected at their respective ends by the integral inwardly inclined or bent end-pieces 24ª and 25ª. A detachable segmental weight 29ª is detachably secured to the end-piece 25ª by means of a countersunk threaded plug 30ª similar to the plug 30 above described. The balancing arm may be constructed as illustrated in Figures 1 and 2, or as illustrated in Figures 8 and 9, and these two forms merely illustrate two types of modifications which fall within the scope of the invention.

In Figures 6, 7 and 7ª, I have illustrated modified types of center bushings which may be used for various sizes of center arbors. The form shown in Figure 6 illustrates one size, at 12ª, and the form shown in Figures 7 and 7ª illustrates a second size, as at 12ᵇ. Figure 7ª illustrates the manner in which the bushing 12ᵇ engages the body portion 10 and the bushing 12 thereof.

The balancing arm, as shown in both forms, comprises a hollow rectangle member, the side strips or rails being slidable in the slots formed in the clamping ring, so that the balancing arm may be adjusted to shift the weighted portions of the balancing arm to a selected position. The balancing arm may then be locked in this selected position to hold the balancing arm firmly in place. Since the weighted ends of the balancing arm are bent or inclined inwardly toward the polishing wheel or rotating member, these weighted ends will in this way lie close to the wheel or rotating member and will only protrude therefrom to a minimum extent. As shown in Figure 1, the body portion 10 may be provided with a selected scale S of the type illustrated upon the outer face thereof adjacent the balancing arm 18. This scale S, as shown in Figure 1, is divided into eight segments, and each segment is divided into four divisions. The divisions of one segment are marked (1) and the divisions in the next segment are numbered (2), the next (3), and the divisions of the remaining segments are numbered as shown progressively, according to the progressive location of the segments from 1 to 8. The purpose of this scale is to readily indicate the exact location of the center of gravity of the article to be balanced, and this indication may be observed at the top (above) or at the bottom (below) the device, regardless of the position of the balancing arm. Should one end of the balancing arm, that is to say, the solid portion thereof, hide the figures of the scale at the top of the device, these figures may be observed at the bottom side. For instance, if the position over the center of gravity is directly at the top of the segment (the divisions of which are numbered 1), the relative positions in the segment (the divisions of which are numbered 5, which segment is diametrically opposite the segment numbered 1), may be observed at the bottom or below the balancing arm. This scale S will aid in placing the balancing arm in the proper position relative to the heavy end opposite the center of gravity, or directly opposite the heavy end. Then, by moving the balancing arm outwardly or inwardly, the article to which the arm is attached may be brought to an exact balance.

The balancing arm 18 which carries different weights 26 and 28 at its opposite ends, may be circumferentially and diametrically adjusted covering all of the diameter and circumference of a given article to be balanced, including a slightly out-of-balance in degrees, from zero to a greater degree. The balancing arm 18 may be located in an adjusted position by means of the clamping nut or collar 14. The arm 18 is of a heavier weight at 28, than at 26, and the weight of end 28 may be increased by adding the weight 29 as described above. The balancing arm 18 may be moved in the direction of the dotted arrow in Figure 1 to the dotted position to move the heavier end carrying the weight 28 toward the center of the wheel A and locked in position by nut 14. This movement brings the device to a perfect balance in and of itself thereby eliminating the necessity of removing the balancing arm 18 from the supporting polishing wheel A, in the operation of dressing down the wheel. This balancing device eliminates the dangerous method now usually employed, of attaching lead and other weights to the side of a polishing wheel in balancing the wheel. The type of balancing arm 18ª, shown in Figures 8 and 9, may be similarly adjusted when substituted for the arm 18.

After the balancing arm has been adjusted and set, an inclosure disc 31 is preferably placed over the extension 20, which disc is engaged by a washer 32 and held against the lock nut 14 by means of the retaining nut 21. The disc 31 is dished as shown in Figure 4, and is provided with an inturned peripheral flange 33 which is adapted to extend toward the polishing wheel A, and inclose and protect the entire mechanism. The edge of the flange 33 is preferably spaced about one-eighth of an inch from the side of the polishing wheel.

As shown in Figure 1, the body portion 10 is provided with enlarged diametrically disposed transverse apertures 34 which are adapted to act as a gig, for boring the holes 23ª in the polishing wheel A. Hollow bushings 35 may be pressed into these holes 23ª to receive the pins 23 which are carried by the body portion 10. As shown in Figure 4, the polishing wheel is preferably provided with holes or sockets 23ª in each side of the polishing wheel or rotatable member A. This will permit the wheel A to be rotated in the same direction on each end of a polishing jack without turning the wheel A around or reversing the same.

Having described the invention, what I claim as new is:

1. In combination with a spindle, a rotatable polishing wheel carried thereby, a body portion carried by the spindle and detachably engaging said wheel, said body portion having a concentric scale formed upon the outer face thereof, an elongated balancing arm movable radially of said scale to accurately and eccentrically position the center of mass of the balancing device to balance said wheel, said scale having graduations extending radially of the scale and in substantially the same direction of adjustment of said balancing arm, and removable weights carried by one end of the balancing arm for adjusting weight of one end of the balancing device.

2. In combination with a spindle, a rotatable polishing wheel mounted thereon, an elongated balancing device having spaced end portions of different weights, parallel side strips connecting the end portions, a clamping member carried by said spindle, said clamping member having parallel transverse slots near the edges thereof for receiving said side strips, the slots having walls of material length for providing a maximum gripping surface to engage the side strips and resist independent rotation and centrifugal force of the balancing device relative to the spindle and clamping member, the polishing wheel carrying abutment means against which the strips are adapted to be clamped, and an adjustable clamping member adjustable relative to the abutment means for clamping the first mentioned clamping member against said side strips and binding said side strips against said abutment means, and the clamping and the adjustable clamping members having abutting faces extending circumferentially of the spindle for providing a maximum clamping area between the clamping members.

3. In combination with a spindle, a rotatable polishing wheel mounted therein, an elongated balancing arm having spaced end portions of different weights, parallel side strips connecting the end portions, a clamping member carried by said spindle, said clamping member having parallel transverse slots near the edges thereof for receiving said side strips, each slot having spaced parallel side walls and an inner wall all of material length for providing a maximum gripping surface to engage the side strips and resist independent rotation and centrifugal force of the balancing arm relative to the spindle and clamping member, the polishing wheel carrying abutment means against which the strips are adapted to be clamped, and an adjustable clamping member adjustable relative to the abutment means for clamping the first mentioned clamping member against said side strips and binding said side strips against said abutment means, and the clamping and the adjustable clamping members having abutting faces extending circumferentially of the spindle for providing a maximum clamping area between the clamping members.

FRED A. NICHOLS.